United States Patent
Li et al.

(10) Patent No.: US 11,157,085 B2
(45) Date of Patent: Oct. 26, 2021

(54) METHOD AND APPARATUS FOR SWITCHING DISPLAY MODE, MOBILE TERMINAL AND STORAGE MEDIUM

(71) Applicant: BEIJING XIAOMI MOBILE SOFTWARE CO., LTD., Beijing (CN)

(72) Inventors: Jiayan Li, Beijing (CN); Jiawei Liu, Beijing (CN); Zhe Liang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/555,131

(22) Filed: Aug. 29, 2019

(65) Prior Publication Data
US 2020/0125177 A1    Apr. 23, 2020

(30) Foreign Application Priority Data
Oct. 19, 2018    (CN) .......................... 201811224783.6

(51) Int. Cl.
*G06F 3/01*    (2006.01)
*G06F 3/0488*    (2013.01)

(52) U.S. Cl.
CPC ............ *G06F 3/017* (2013.01); *G06F 3/0488* (2013.01)

(58) Field of Classification Search
CPC ........ G06F 3/017; G06F 3/041; G06F 3/0488; G06F 3/04883; G06F 3/04808; G06F 3/04845; G06F 3/04886
See application file for complete search history.

(56) References Cited

U.S. PATENT DOCUMENTS

| | | | | |
|---|---|---|---|---|
| 2012/0229410 A1* | 9/2012 | Ohashi | ................ | G06F 3/04883 345/173 |
| 2012/0235930 A1* | 9/2012 | Lazaridis | .......... | H04M 1/72547 345/173 |
| 2013/0191791 A1* | 7/2013 | Rydenhag | ............... | G06F 3/017 715/863 |
| 2014/0164990 A1* | 6/2014 | Kim | ...................... | G06F 3/0486 715/790 |
| 2014/0267115 A1* | 9/2014 | Jeon | .................... | G06F 3/04883 345/173 |

(Continued)

FOREIGN PATENT DOCUMENTS

| | | |
|---|---|---|
| CN | 105843531 A | 8/2016 |
| CN | 105867732 A | 8/2016 |

(Continued)

OTHER PUBLICATIONS

First office action in Chinese application No. 201811224783.6 dated Apr. 9, 2020.

(Continued)

*Primary Examiner* — Kenneth Bukowski
(74) *Attorney, Agent, or Firm* — Syncoda LLC; Feng Ma

(57) ABSTRACT

A method for switching display mode of a mobile terminal includes: detecting gesture operations at a left edge and/or a right edge of a screen of the mobile terminal; upon detection a specified gesture operation for switching display mode, acquiring, according to the specified gesture operation, a mode switching instruction that corresponds to the specified gesture operation; and switching the current display mode according to the mode switching instruction.

20 Claims, 10 Drawing Sheets

(56) References Cited

U.S. PATENT DOCUMENTS

| | | | |
|---|---|---|---|
| 2014/0304651 A1* | 10/2014 | Johansson | G06F 3/0482 715/810 |
| 2014/0351761 A1* | 11/2014 | Bae | G06F 3/017 715/835 |
| 2015/0205507 A1* | 7/2015 | Chen | G06F 3/04847 715/800 |
| 2016/0132188 A1 | 5/2016 | Li et al. | |
| 2016/0210034 A1* | 7/2016 | Zhu | G06F 3/04883 |

FOREIGN PATENT DOCUMENTS

| | | | |
|---|---|---|---|
| CN | 106055145 A | 10/2016 | |
| CN | 106959810 A | 7/2017 | |
| CN | 107678591 A | 2/2018 | |
| EP | 2631770 A1 | 8/2013 | |
| EP | 2787426 A1 | 10/2014 | |

OTHER PUBLICATIONS

Extended European search report of counterpart EP application No. 19198945.8 dated Mar. 5, 2020.
Communication pursuant to Article 94 (3) EPC of European Application No. 19198945.8 dated Sep. 6, 2021.

* cited by examiner

METHOD AND APPARATUS FOR SWITCHING DISPLAY MODE, MOBILE TERMINAL AND STORAGE MEDIUM

CROSS-REFERENCE TO RELATED APPLICATION

This application claims priority to Chinese Patent Application No. 201811224783.6, filed on Oct. 19, 2018, the disclosure of which is incorporated herein by reference in its entirety.

BACKGROUND

To improve user experience, a mobile terminal is usually installed with a large number of applications. The various applications may be distributed in a number of pages of a graphic user interface (GUI) of the mobile terminal, which is driven by an operating system of the mobile terminal.

SUMMARY

The present disclosure relates to the field of mobile terminal technologies, and more specifically to a method and apparatus for switching display mode, a mobile terminal and a storage medium.

According to an aspect of the present disclosure, there is provided a method for switching display mode, which is applied to a mobile terminal, including:

detecting a left edge and/or a right edge of a terminal screen of the mobile terminal;

when a specified gesture operation for switching display mode is detected, acquiring, according to the specified gesture operation, a mode switching instruction that corresponds to the specified gesture operation; and switching display mode according to the mode switching instruction.

In some embodiments, wherein said detecting the left edge and/or the right edge of the terminal screen of the mobile terminal includes:

detecting the left edge and/or the right edge of the terminal screen of the mobile terminal;

determining that the specified gesture operation for switching the display mode is detected when a first sliding operation of sliding from the left edge to the right edge by more than a first preset distance and a second sliding operation of sliding downwards from an end position of the first sliding operation by more than a second preset distance are detected; and determining that the specified gesture operation for switching the display mode is detected when a third sliding operation of sliding from the right edge to the left edge by more than a third preset distance and a fourth sliding operation of sliding downwards from an end position of the third sliding operation by more than a fourth preset distance are detected.

In some embodiments, prior to detecting the specified gesture operation for switching the display mode, the method further includes:

determining a first pause interval between the first sliding operation and the second sliding operation; and executing the step of determining that the specified gesture operation for switching the display mode is detected when the first pause interval is less than a first preset time interval; and/or determining a second pause interval between the third sliding operation and the fourth sliding operation; and executing the step of determining that the specified gesture operation for switching the display mode is detected when the second pause interval is less than a second preset time interval.

In some embodiments, the method further includes:

determining a first included angle between a sliding trajectory and a vertical surface in the process of sliding downwards from the end position of the first sliding operation; and determining that the second sliding operation of sliding downwards is detected when the first included angle is within a first preset included angle range; and/or determining a second included angle between the sliding trajectory and the vertical surface in the process of sliding downwards from the end position of the third sliding operation; and determining that the fourth sliding operation of sliding downwards is detected when the second included angle is within a second preset included angle range.

In some embodiments, wherein the mode switching instruction is a one-hand mode switching instruction.

In some embodiments, wherein said detecting the left edge and/or the right edge of the terminal screen of the mobile terminal includes:

detecting the left edge and/or the right edge of the terminal screen of the mobile terminal;

determining that the specified gesture operation for switching the display mode is detected when a fifth sliding operation of sliding from the left edge to the right edge by more than a fifth preset distance and a sixth sliding operation of sliding upwards from an end position of the fifth sliding operation by more than a sixth preset distance are detected; and determining that the specified gesture operation for switching the display mode is detected when a seventh sliding operation of sliding from the right edge to the left edge by more than a seventh preset distance and an eighth sliding operation of sliding upwards from an end position of the seventh sliding operation by more than an eighth preset distance are detected.

In some embodiments, prior to detecting the specified gesture operation for switching the display mode, the method further includes:

determining a third pause interval between the fifth sliding operation and the sixth sliding operation; and executing the step of determining that the specified gesture operation for switching the display mode is detected when the third pause interval is less than a third preset time interval; and/or determining a fourth pause interval between the seventh sliding operation and the eighth sliding operation; and executing the step of determining that the specified gesture operation for switching the display mode is detected when the fourth pause interval is less than a fourth preset time interval.

In some embodiments, the method further includes:

determining a third included angle between the sliding trajectory and the vertical surface in the process of sliding upwards from the end position of the fifth sliding operation; and determining that the sixth sliding operation of sliding upwards is detected when the third included angle is within a third preset included angle range; and determining a fourth included angle between the sliding trajectory and the vertical surface in the process of sliding upwards from the end position of the sixth sliding operation; and determining that the eighth sliding operation of sliding upwards is detected when the fourth included angle is within a fourth preset included angle range.

In some embodiments, wherein the mode switching instruction is a split screen mode switching instruction.

In some embodiments, the method further includes:

triggering a return instruction when a ninth sliding operation from the left edge to the right edge or a tenth sliding operation from the right edge to the left edge are detected, and executing a return operation that corresponds to the return instruction.

In some embodiments, the method further includes:

triggering an application switching instruction when an eleventh sliding operation from the left edge to the right edge is detected and a pause duration of the eleventh sliding operation reaches a first preset duration, or when a twelfth sliding operation from the right edge to the left edge is detected and a pause duration of the twelfth sliding operation reaches a second preset duration, and switching an application displayed in the current interface to the previous application according to the application switching instruction.

According to a second aspect of the present disclosure, there is provided an apparatus for switching display mode, which is applied to a mobile terminal, including:

a detection module configured to detect a left edge and/or a right edge of a terminal screen of the mobile terminal;

an acquisition module configured to, when a specified gesture operation for switching display mode is detected, acquire, according to the specified gesture operation, a mode switching instruction that corresponds to the specified gesture operation; and a switching module configured to switch display mode according to the mode switching instruction.

In some embodiments, wherein the detection module is further configured to:

detect the left edge and/or the right edge of the terminal screen of the mobile terminal;

determine that the specified gesture operation for switching the display mode is detected when a first sliding operation of sliding from the left edge to the right edge by more than a first preset distance and a second sliding operation of sliding downwards from an end position of the first sliding operation by more than a second preset distance are detected; and determine that the specified gesture operation for switching the display mode is detected when a third sliding operation of sliding from the right edge to the left edge by more than a third preset distance and a fourth sliding operation of sliding downwards from an end position of the third sliding operation by more than a fourth preset distance are detected.

In some embodiments, the apparatus further includes:

a first determination module configured to determine a first pause interval between the first sliding operation and the second sliding operation; and determine that the specified gesture operation for switching the display mode is detected when the first pause interval is less than a first preset time interval;

and/or a second determination module configured to determine a second pause interval between the third sliding operation and the fourth sliding operation; and determine that the specified gesture operation for switching the display mode is detected when the second pause interval is less than a second preset time interval.

In some embodiments, the apparatus further includes:

a third determination module configured to determine a first included angle between a sliding trajectory and a vertical surface in the process of sliding downwards from the end position of the first sliding operation, and determine that the second sliding operation of sliding downwards is detected when the first included angle is within a first preset included angle range; and/or a fourth determination module configured to determine a second included angle between the sliding trajectory and the vertical surface in the process of sliding downwards from the end position of the third sliding operation, and determine that the fourth sliding operation of sliding downwards is detected when the second included angle is within a second preset included angle range.

In a possible implementation, wherein the mode switching instruction is a one-hand mode switching instruction.

In some embodiments, wherein the detection module is further configured to:

detect the left edge and/or the right edge of the terminal screen of the mobile terminal;

determine that the specified gesture operation for switching the display mode is detected when a fifth sliding operation of sliding from the left edge to the right edge by more than a fifth preset distance and a sixth sliding operation of sliding upwards from an end position of the fifth sliding operation by more than a sixth preset distance are detected; and determine that the specified gesture operation for switching the display mode is detected when a seventh sliding operation of sliding from the right edge to the left edge by more than a seventh preset distance and an eighth sliding operation of sliding upwards from an end position of the seventh sliding operation by more than an eighth preset distance are detected.

In some embodiments, the apparatus further includes:

a fifth determination module configured to determine a third pause interval between the fifth sliding operation and the sixth sliding operation, and determine that the specified gesture operation for switching the display mode is detected when the third pause interval is less than a third preset time interval; or a sixth determination module configured to determine a fourth pause interval between the seventh sliding operation and the eighth sliding operation, and determine that the specified gesture operation for switching the display mode is detected when the fourth pause interval is less than a fourth preset time interval.

In some embodiments, the apparatus further includes:

a seventh determination module configured to determine a third included angle between the sliding trajectory and the vertical surface in the process of sliding upwards from the end position of the fifth sliding operation, and determine that the sixth sliding operation of sliding upwards is detected when the third included angle is within a third preset included angle range; and an eighth determination module configured to determine a fourth included angle between the sliding trajectory and the vertical surface in the process of sliding upwards from the end position of the sixth sliding operation, and determine that the eighth sliding operation of sliding upwards is detected when the fourth included angle is within a fourth preset included angle range.

In some embodiments, the mode switching instruction is a split screen mode switching instruction.

In some embodiments, the apparatus further includes:

a first triggering module configured to trigger a return instruction when a ninth sliding operation from the left edge to the right edge or a tenth sliding operation from the right edge to the left edge is detected; and a first execution module configured to perform a return operation that corresponds to the return instruction.

In some embodiments, the apparatus further includes:

a second triggering module configured to trigger an application switching instruction when an eleventh sliding operation from the left edge to the right edge is detected and a pause duration of the eleventh sliding operation reaches a first preset duration, or when a twelfth sliding operation from the right edge to the left edge is detected and a pause duration of the twelfth sliding operation reaches a second preset duration; and a second execution module configured to switch an application displayed in the current interface to the previous application according to the application switching instruction.

According to another aspect of the present disclosure, there is provided a mobile terminal, including:

a processor; and a memory for storing executable instructions of the processor, wherein the processor is configured to:

detect a left edge and/or a right edge of a terminal screen of the mobile terminal;

when a specified gesture operation for switching display mode is detected, acquire, according to the specified gesture operation, a mode switching instruction that corresponds to the specified gesture operation; and switch display mode according to the mode switching instruction.

In yet another aspect of the present disclosure, there is provided a non-transitory computer-readable storage medium in which instructions are stored, wherein the instructions are executed by a processor to implement the method for switching display mode according to the method for switching display mode of the first aspect of examples of the present disclosure above.

It should be understood that both the foregoing general description and the following detailed description are exemplary and explanatory only and are not restrictive of the disclosure.

BRIEF DESCRIPTION OF THE DRAWINGS

The drawings herein that are integrated into the description and constitute a part of the description of the present disclosure show examples of the present disclosure and are intended to explain the principle of the present disclosure together with the description.

DETAILED DESCRIPTION

Figure 1:
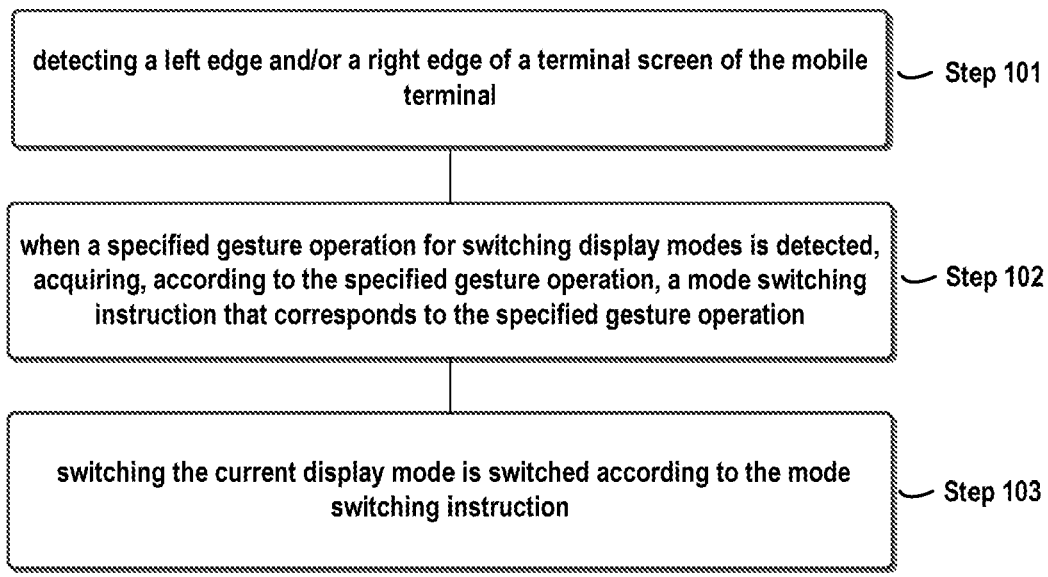
FIG. 1 is a flowchart illustrating a method for switching display mode according to some embodiments.

Hereinafter, some examples will be described in detail. The examples are shown in the drawings. In the following description when referring to the drawings, the same numerals in the different drawings may denote the same or similar elements. The examples described in the following examples are not representative of all examples consistent with the present disclosure. Rather, they are merely examples of apparatuses and methods consistent with some aspects of the present disclosure as detailed in the appended claims.

It is to be understood that both the foregoing general description and the following detailed description are exemplary and explanatory only and are not restrictive of the present disclosure.

The inventors of the present disclosure have recognized that, in the course of using the mobile terminal, there may be a need to switch display mode to enter a split screen mode or a one-hand mode. The split screen mode refers to dividing a terminal screen into two display areas in which application interfaces of two applications are simultaneously displayed. The one-hand mode refers to scaling the current display interface down, and displaying the scaled-down display interface on the lower left side or lower right side of the terminal screen.

When the mobile terminal switches the display mode, the display mode is switched by a switch button set in a setting interface. Alternatively, the mobile terminal sets a physical button or a virtual button on the terminal screen to acquire a related switching instruction when a triggering operation of the corresponding physical button or virtual button is detected, and switches the display mode according to the switching instruction.

To overcome the problems in the mobile terminal usage and improve user experience, various embodiments of the present disclosure provide a method and a device for switching the display mode.

The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

FIG. 1 is a flowchart illustrating a method for switching display mode according to some embodiments. As shown in FIG. 1, the method for switching the display mode can be applied to a mobile terminal and include the following steps.

In step S101, detecting a left edge and/or a right edge of a terminal screen of the mobile terminal.

In step S102, when a specified gesture operation for switching display mode is detected, acquiring, according to the specified gesture operation, a mode switching instruction that corresponds to the specified gesture operation.

In step S103, switching display mode according to the mode switching instruction.

Because a user may directly perform a specified gesture operation on the left edge or the right edge of the terminal screen, the mobile terminal can be triggered to switch the display mode, such that the operation process is simple, thereby improving the switching efficiency.

Figure 2:
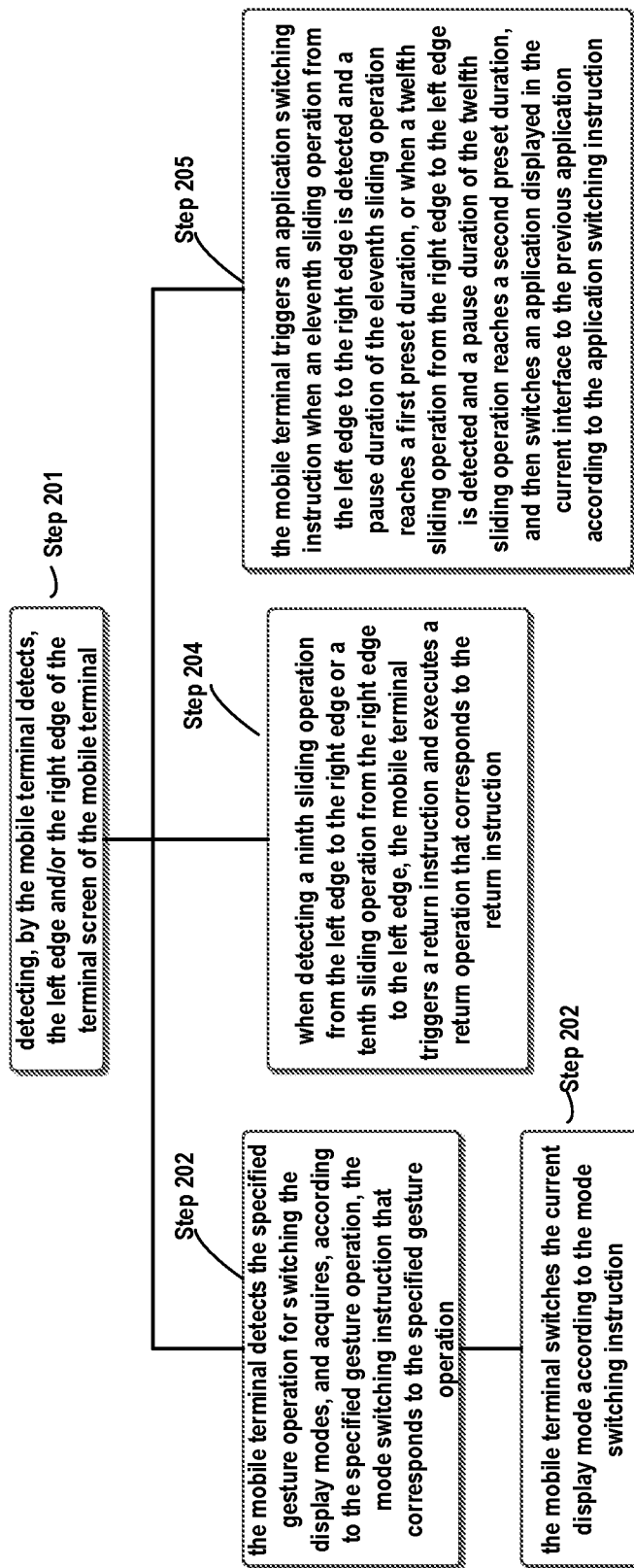
FIG. 2 is a flowchart illustrating another method for switching display mode according to some embodiments.

FIG. 2 is a flowchart illustrating another method for switching display mode according to some embodiments. As shown in FIG. 1, the method for switching the display mode can be applied to a mobile terminal and include the following steps.

In step S201, detecting, by the mobile terminal, the left edge and/or the right edge of the terminal screen of the mobile terminal.

The mobile terminal has a plurality of display mode and supports the switching among the plurality of display mode. When a user switches the current display mode, a specified gesture operation for switching the display mode may be triggered on the left edge and/or the right edge of the terminal screen.

The specified gesture operation may be a gesture operation of sliding from the left edge to the right edge by a certain distance and then sliding downwards; a gesture operation of sliding from the right edge to the left edge by a certain distance and then sliding downwards; a gesture operation of sliding from the left edge to the right edge by a certain distance and then sliding upwards; a gesture operation of sliding from the right edge to the left edge by a certain distance and then sliding upwards, or the like. The display mode may be a one-hand mode, a split screen mode, or the like.

In a first implementation, when the specified gesture operation is the gesture operation of sliding from the left edge to the right edge by a certain distance and then sliding downwards, or a gesture operation of sliding from the right edge to the left edge by a certain distance and then sliding downwards, the step S201 may be implemented by the following steps (1) to (3).

In step (1), the mobile terminal detects the left edge and/or the right edge of the terminal screen of the mobile terminal.

After the step (1) is executed, step (2) or (3) is executed.

In step (2), when a first sliding operation of sliding from the left edge to the right edge by more than a first preset distance and a second sliding operation of sliding downwards from an end position of the first sliding operation by more than a second preset distance are detected, the mobile terminal determines that a specified gesture operation for switching the display mode is detected, and then ends the step (2).

In a possible implementation, after detecting a signal that the gesture operation starts, the mobile terminal records a trajectory of the gesture operation. The mobile terminal determines that the first sliding operation is detected when the trajectory of the detected gesture operation is to slide from the left edge to the right edge of the terminal screen and the sliding distance exceeds a first preset distance, then the mobile terminal determines that a second sliding operation is detected when the trajectory of the detected gesture operation is to slide downwards from an end position of the first sliding operation and the sliding distance exceeds a second preset distance.

By setting of the first preset distance, which is not specifically limited in examples, mis-operation can be prevented in the course of use. F or example, the first preset distance may be set to a distance of 20 pixels. When a gesture operation of sliding from the left edge to the right edge of the terminal screen by more than 20 pixels, the detected gesture operation is determined as the first sliding operation. When a gesture operation of sliding from the left edge to the right edge of the terminal screen by no more than 20 pixels, the detected gesture operation is determined not to be the first sliding operation.

By setting of the second preset distance, which is also not specifically limited in examples, the mobile terminal can be enabled to more clearly determine the detected gesture operation. For example, the second preset distance may be set to a distance of 100 pixels.

When a gesture operation of sliding downwards from the end position of the first sliding operation by more than 100 pixels, the detected gesture operation is determined as the second sliding operation. When a gesture operation of sliding downwards from the end position of the first sliding operation by no more than 100 pixels, the detected gesture operation may be determined as a false touch or other gesture operation, rather than the second sliding operation.

As such, when the first sliding operation of sliding from the left edge to the right edge by more than the first preset distance and the second sliding operation of sliding downwards from the end position of the first sliding operation by more than the second preset distance are detected, it is determined that the specified gesture operation for switching the display mode is detected.

It should be noted that the first preset distance and the second preset distance may be equal according to some embodiments, or may be unequal according to some other embodiments. In addition, the first preset distance and the second preset distance may be set and changed as needed. In some embodiments of the present disclosure, the first preset distance and the second preset distance are not specifically limited.

In some embodiments, a first pause interval exists between the first sliding operation and the second sliding operation. That is, there is a pause when the first sliding operation ends and the second sliding operation starts, because the sliding directions of the first sliding operation and the second sliding operation are different, resulting in a pause occurring in steering.

When the first pause interval is less than a first preset time interval of the mobile terminal, the mobile terminal determines that the specified gesture operation for switching the display mode is detected. When the first pause interval is not less than the first preset time interval, the mobile terminal determines that the specified gesture operation for switching the display mode is not detected.

The first preset time interval may be set and changed as needed. In some embodiments of the present disclosure, the first preset time interval is not specifically defined; for example, the first preset time interval is 1 second. When a time interval between the first sliding operation and the second sliding operation is less than 1 second, it is determined that the specified gesture operation for switching the display mode is detected. When the signal that the second operation starts is not detected within 1 second after the first operation ends, that is, after a signal that the second operation is completed is detected, a time interval between the signal that the first operation ends and the signal that the second operation starts is calculated.

If the time interval is greater than 1 second, it is determined that the specified gesture operation for switching the display mode is not detected, and this operation may be other gesture operations.

In some embodiments, in the process of the second sliding operation of sliding downwards from the end position of the first sliding operation by more than the second preset distance, a first included angle between a sliding trajectory and a vertical plane of the second sliding operation may also be determined.

In some embodiments, the first sliding operation and the second sliding operation are perpendicular to each other. In some embodiments, during the actual operation, the sliding trajectory may be not horizontal or vertical, and may have some variations from a right angle.

In some embodiments, at first, the first included angle between the second sliding operation and the vertical plane, which is the left edge of the screen, is determined. When the first included angle is within a first preset included angle range of the mobile terminal, the mobile terminal determines that the second sliding operation of sliding downwards is detected. When the first included angle is not within the first preset included angle range, the mobile terminal determines that the second sliding operation of sliding downwards is not detected.

Figure 3:
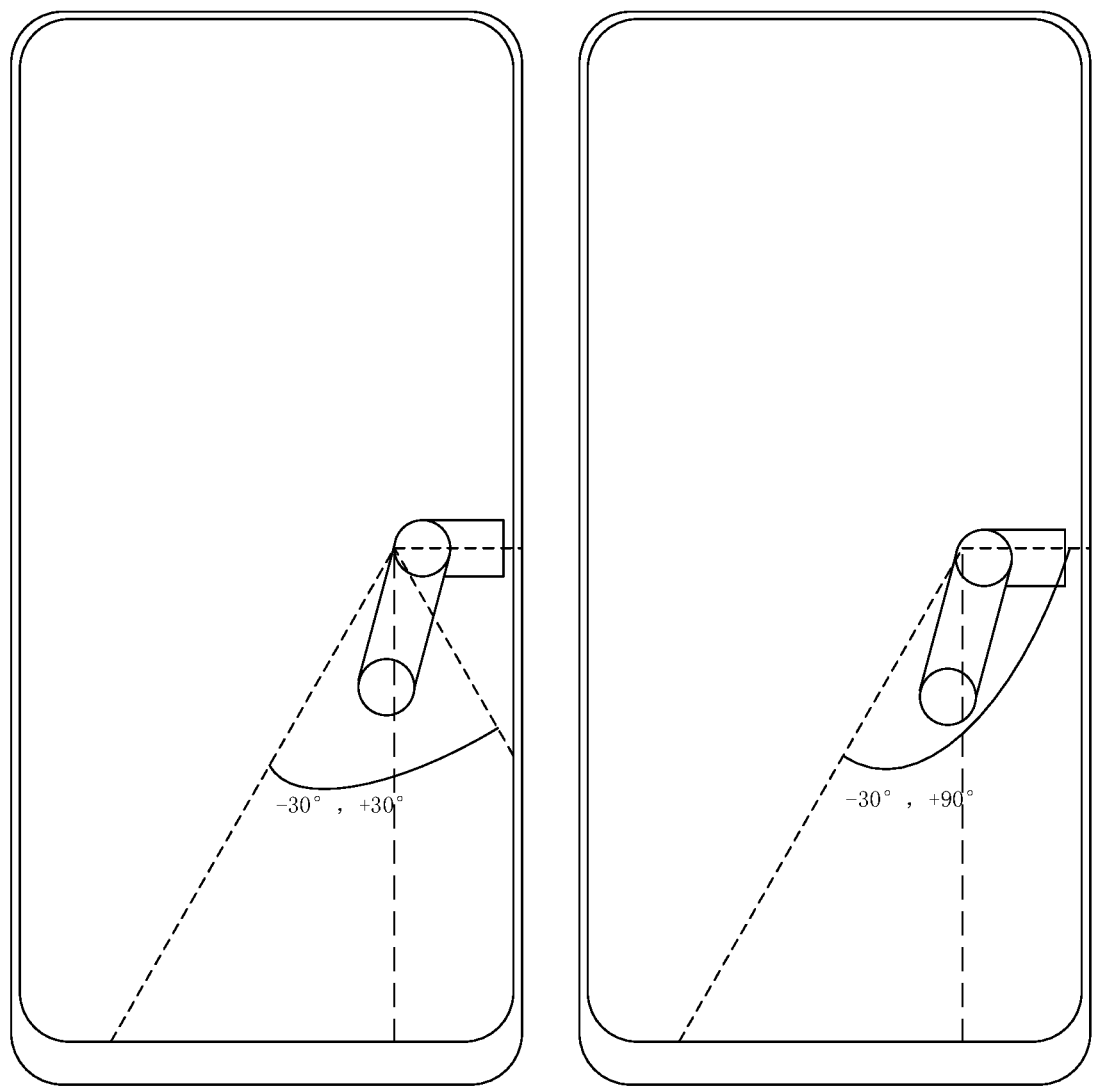
FIG. 3 is a schematic diagram illustrating a gesture operation according to some embodiments.

For example, the first preset included angle range may be set and changed as needed. In some embodiments of the present disclosure, the first preset included angle range is not specifically limited. For example, the first preset included angle range may be (−30°, +30°), and then the second sliding operation is determined in the case where a sliding trajectory of the second sliding operation is within the range of 30°, as shown in the left-side panel of FIG. 3. The first preset included angle range may also be (−30°, +90°), and the range of the sliding trajectory of the second sliding operation is larger, as shown in the right-side panel of FIG. 3.

In step (3), the mobile terminal determines that the specified gesture operation for switching the display mode is detected when a third sliding operation of sliding from the right edge to the left edge by more than a third preset distance, and a fourth sliding operation of sliding downwards from an end position of the third sliding operation by more than a fourth preset distance are detected.

Similarly, the manner, in the step (2) above, of detection for switching display mode by the first sliding operation of sliding from the left edge to the right edge by more than the first preset distance and the second sliding operation of sliding downwards from the end position of the first sliding operation by the second preset distance, could be applied to the case of detection for switching display mode by the third sliding operation of sliding from the right edge to the left edge by more than the third preset distance and the fourth sliding operation of sliding downwards from the end position of the third sliding operation by the fourth preset distance.

The third preset distance may be the same as or different from the first preset distance. The fourth preset distance may be the same as or different from the second preset distance. In some embodiments of the present disclosure, these preset distances are not specifically limited.

Similarly, there is a second pause interval between the third sliding operation and the fourth sliding operation, and the second pause interval is determined in the same manner as the first pause interval. When the second pause interval is less than a second preset time interval of the mobile terminal, the mobile terminal determines that the specified gesture operation for switching the display mode is detected. When the second pause interval is detected not to be less than the second preset time interval, the mobile terminal determines that the specified gesture operation for switching the display mode is not detected.

The second preset time interval may be equal to or not equal to the first preset time interval. Moreover, the second preset time interval may be set and changed as needed, and is not specifically limited in some embodiments of the present disclosure.

Similarly, in the sliding process of sliding downwards from the end position of the third sliding operation by more than the fourth preset distance, it is also necessary to determine a second included angle between a sliding trajectory of the fourth sliding operation and the vertical plane. When the second included angle is within a second preset included angle range, the mobile terminal determines that the fourth sliding operation of sliding downwards is detected. When the second included angle is not within the second preset included angle range, the mobile terminal determines that the fourth sliding operation of sliding downwards is not detected.

The second preset included angle range may be the same as or different from the first preset included angle range. Moreover, the second preset included angle range may be set and changed as needed. In some embodiments of the present disclosure, the preset included angle ranges are not specifically limited.

In some embodiments, when the specified gesture operation is a gesture operation of sliding from the left edge to the right edge by a certain distance and then sliding upwards, or a gesture operation of sliding from the right edge to the left edge by a certain distance and then sliding upwards, this step (3) may be implemented by the following steps (A) to (C).

In step (A), the mobile terminal detects a left edge and/or a right edge of a screen of the mobile terminal.

After the step (A) is executed, step (B) or (C) is executed.

In step (B), when a fifth sliding operation of sliding from the left edge to the right edge by more than a fifth preset distance and a sixth sliding operation of sliding upwards from an end position of the fifth sliding operation by more than a sixth preset distance are detected, the mobile terminal determines that the specified gesture operation for switching the display mode is detected, and then ends the step (B).

In step (C), the mobile terminal determines that the specified gesture operation for switching the display mode is detected when a seventh sliding operation of sliding from the right edge to the left edge by more than a seventh preset distance and an eighth sliding operation of sliding upwards from an end position of the seventh sliding operation by more than an eighth preset distance are detected.

The specific implementation manner of the step (B) or (C) may refer to the second sliding operation of sliding downwards and the fourth sliding operation of sliding downwards. In the case where the sliding directions are different, the specific parameters may be set to be the same or different, and will not be specifically limited in embodiments of the present disclosure.

It should be noted that the mobile terminal detects the left edge and/or the right edge of the terminal screen of the mobile terminal in a bright screen state. In addition, the mobile terminal may detect the left edge and/or the right edge of the terminal screen in any interface which is displayed. For example, the terminal may detect the left edge and/or the right edge of the terminal screen in a main interface, or in an application interface.

The left edge of the terminal screen may be in the middle of the left edge of the terminal screen, or the upper end of the left edge of the terminal screen, or the lower end of the left edge of the terminal screen. Correspondingly, the left edge of the terminal screen is a first designated area including a left boundary of the terminal screen.

The width of the first designated area is less than half of the width of the terminal screen, and the height of the first designated area is not greater than the height of the terminal screen. The width and height of the first designated area may be set and changed as needed, and will not be specifically limited in embodiments of the present disclosure.

Figure 4:
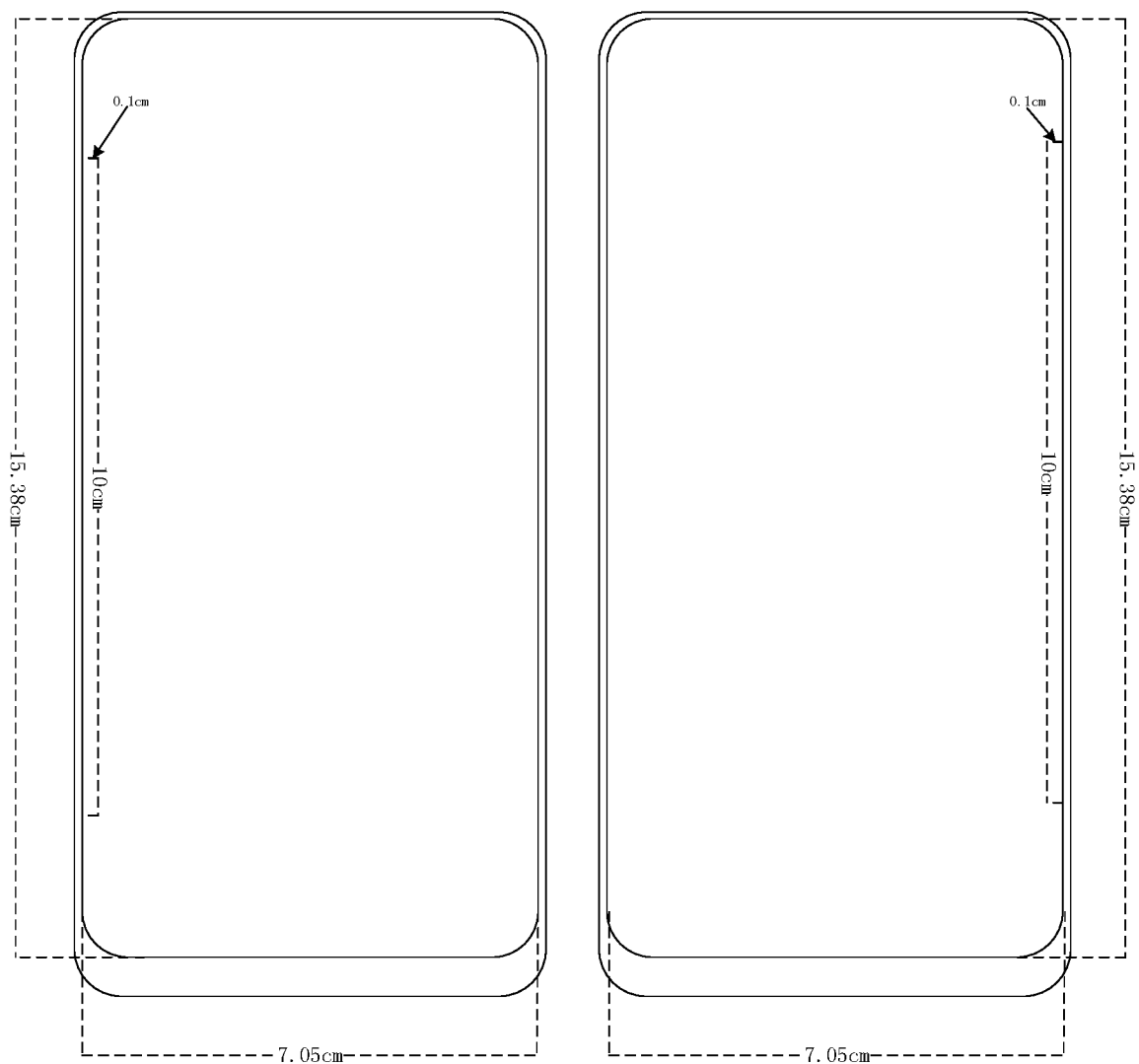
FIG. 4 is a schematic diagram illustrating a screen edge detection range according to some embodiments.

For example, if the terminal screen has a height of 15.38 cm and a width of 7.05 cm, the left edge may be a first designated area which includes a left boundary, has a width of 0.1 cm and a height of 10 cm and is located in the middle of the screen as shown in the left-side panel of FIG. 4.

Similarly, the right edge of the terminal screen may be in the middle of the right edge of the terminal screen, or the upper end of the right edge of the terminal screen, or the lower end of the right edge of the terminal screen.

Correspondingly, the right edge of the terminal screen is a second designated area including a right boundary of the terminal screen. Similarly, the width of the second designated area is less than half of the width of the terminal screen, and the height of the second designated area is not greater than the height of the terminal screen.

The width and height of the second designated area may be set and changed as needed, and will not be specifically limited in embodiments of the present disclosure.

For example, if the terminal screen has a height of 15.38 cm and a width of 7.05 cm, the right edge may be a second designated area which includes a right boundary, has a width of 0.1 cm and a height of 10 cm and is located in the middle of the screen, as shown in the right-side panel of FIG. 4.

The mobile terminal may be a mobile phone, a tablet computer, a smart home device, or a smart wearable device. The mobile terminal is not specifically limited in embodiments of the present disclosure.

It should be further noted that the mobile terminal may also be configured to trigger, from the left edge or the right edge, a return instruction or an application switching instruction. The return instruction is triggered by releasing the hand after sliding from the left edge to the right edge, or releasing the hand after sliding from the right edge to the left edge. The application switching instruction is triggered by releasing the hand after sliding from the left edge to the right edge and pausing, or releasing the hand after sliding from the right edge to the left edge and pausing.

When the specified gesture operation for switching the display mode is detected, step S202 is executed. When the gesture operation of releasing the hand after sliding from the left edge to the right edge or releasing the hand after sliding from the right edge to the left edge is detected, step S204 is executed. When the gesture operation of releasing the hand after sliding from the left edge to the right edge and pausing, or releasing the hand after sliding from the right edge to the left edge and pausing is detected, step S205 is executed.

In step S202, the mobile terminal detects the specified gesture operation for switching the display mode, and acquires, according to the specified gesture operation, the mode switching instruction that corresponds to the specified gesture operation.

Prior to this step, the mobile terminal stores a corresponding relationship between the gesture operation and the mode switching instruction therein. Correspondingly, the step may be as follows: the mobile terminal queries, according to the specified gesture operation, the mode switching instruction that corresponds to the specified gesture operation from the corresponding relationship between the gesture operation and the mode switching instruction. The mode switching instruction may be any switching instruction for switching the display mode. For example, the mode switching instruction may be a one-hand mode switching instruction or a split screen mode switching instruction.

In some embodiments, the foregoing corresponding relationship may be preset and unchangeable, or may be set in a setting interface of the mobile terminal. A manner of setting the corresponding relationship according to some embodiments is as follows: the mobile terminal displays a mode switching instruction list, the mode switching instruction list including at least one mode switching instruction.

When it is detected that one of the mode switching instructions is selected, for example, the selected mode switching instruction is a one-hand mode switching instruction, the mobile terminal displays a list of selectable gesture operations, the list of gesture operations including at least one gesture operation. The user may select one of the gesture operations from the list of the gesture operations. The mobile terminal establishes a corresponding relationship between the selected gesture operation and the one-hand mode switching instruction. In some embodiments of the present disclosure, the manner of setting the corresponding relationship between the gesture operation and the mode switching instruction is not specifically limited.

In some embodiments, the gesture operation that corresponds to the one-hand mode switching instruction is a gesture operation of sliding from the left edge to the right edge and then sliding downwards quickly. Correspondingly, when the first sliding operation of sliding from the left edge to the right edge by more than the first preset distance and the second sliding operation of sliding downwards from the end position of the first sliding operation by more than the second preset distance are detected, the mobile terminal determines that the specified gesture operation for switching the display mode is detected, and then acquires a mode switching instruction that corresponds to the specified gesture operation, the mode switching instruction that corresponds to the specified gesture operation being a one-hand mode switching instruction.

In some embodiments, the gesture operation that corresponds to the one-hand mode switching instruction is a gesture operation of sliding from the right edge to the left edge and sliding downwards quickly. Correspondingly, when the third sliding operation of sliding from the right edge to the left edge by more than the third preset distance and the fourth sliding operation of sliding downwards from the end position of the third sliding operation by more than the fourth preset distance are detected, the mobile terminal determines that the specified gesture operation for switching the display mode is detected, and then acquires a mode switching instruction that corresponds to the specified gesture operation, the mode switching instruction that corresponds to the specified gesture operation being the one-hand mode switching instruction.

In some embodiments, the gesture operation that corresponds to a split screen mode switching instruction is a gesture operation of sliding from the left edge to the right edge and sliding upwards quickly. Correspondingly, when the fifth sliding operation of sliding from the left edge to the right edge by more than the fifth preset distance and the sixth sliding operation of sliding upwards from the end position of the fifth sliding operation by more than the sixth preset distance are detected, the mobile terminal determines that the specified gesture operation for switching the display mode is detected, and then acquires a mode switching instruction that corresponds to the specified gesture operation, the mode switching instruction that corresponds to the specified gesture operation being the split screen mode switching instruction.

In some embodiments, the gesture operation that corresponds to a split screen mode switching instruction is a gesture operation of sliding from the right edge to the left edge and sliding upwards quickly. Correspondingly, when the seventh sliding operation of sliding from the right edge to the left edge by more than the seventh preset distance and the eighth sliding operation of sliding upwards from the end position of the seventh sliding operation by more than the eighth preset distance are detected, the mobile terminal determines that the specified gesture operation for switching the display mode is detected, and then acquires a mode switching instruction that corresponds to the specified gesture operation, the mode switching instruction that corresponds to the specified gesture operation being the split screen mode switching instruction.

It should be further noted that, in some embodiments of the present disclosure, the mobile terminal immediately executes step S203, acquires the mode switching instruction that corresponds to the specified gesture operation, and switches the current display mode, no matter if the specified gesture operation ends. The mode switching can be performed immediately without waiting for the end of the specified gesture operation, thereby improving the switching efficiency.

In step S203, the mobile terminal switches the current display mode according to the mode switching instruction, and then ends the step.

When the mode switching instruction is a one-hand mode switching instruction, the mobile terminal switches the current display mode according to the one-hand mode switching instruction.

When the current display mode is not a one-hand mode, the mobile terminal switches the current display mode to the one-hand mode according to the one-hand mode switching instruction.

Figure 5:
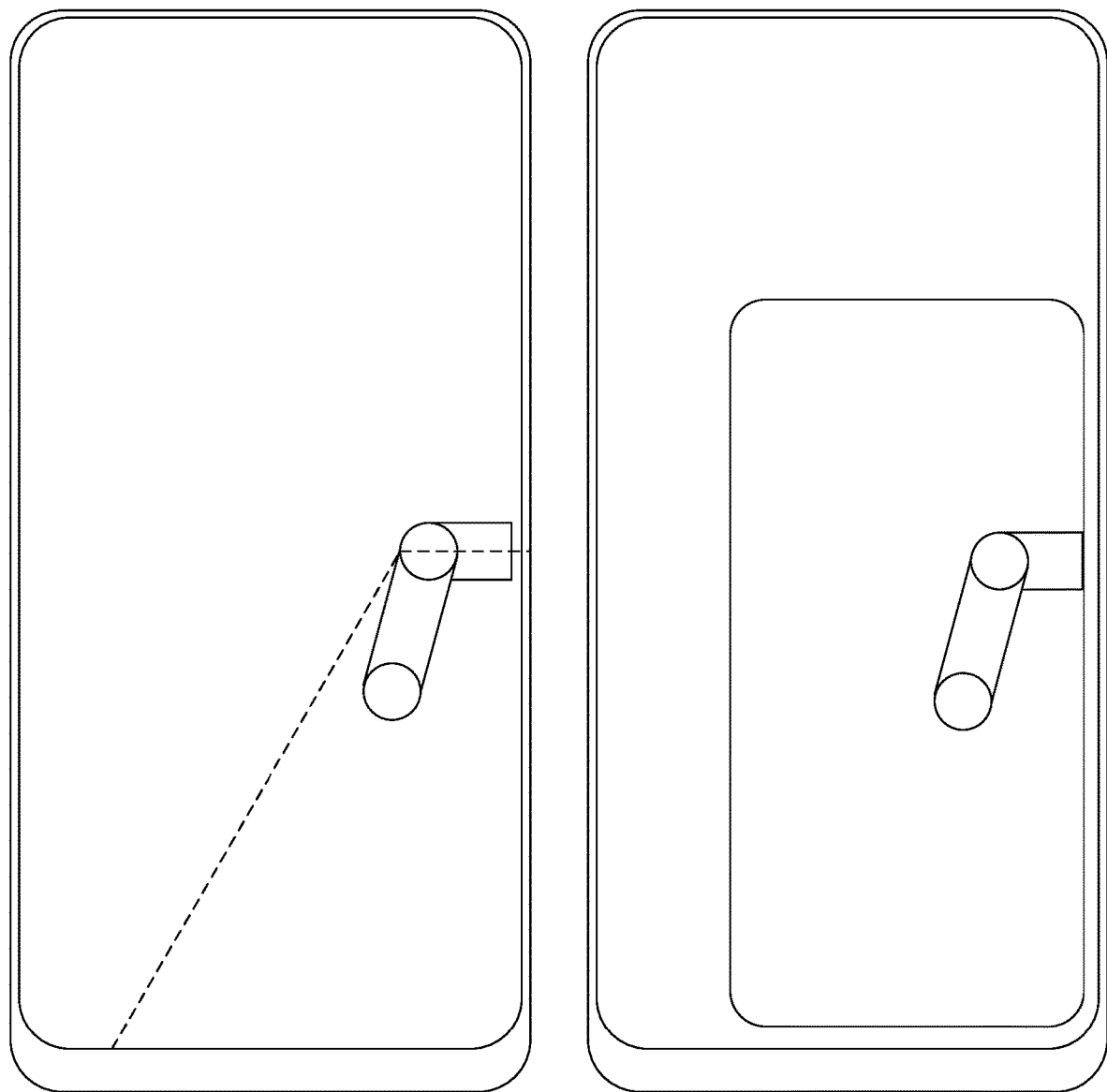
FIG. 5 is a schematic diagram illustrating another gesture operation according to some embodiments.

For example, referring to FIG. 5, the left-side panel is a gesture operation for switching the one-hand mode, and the right-side panel is a schematic diagram of the completion of the switch.

When the current display mode is switched to the one-hand mode, the mobile terminal scales a display area down proportionally. When the current display mode is the one-hand mode, the mobile terminal switches the current display mode to a mode other than the one-hand mode according to the one-hand mode switching instruction.

It should be noted that, during a gesture operation of sliding from the left edge to the right edge of the mobile terminal and completing the switching to the one-hand mode, the mobile terminal scales the display area down proportionally, and the scaled-down display area is located at the lower left corner of the screen of the mobile terminal.

During a gesture operation of sliding from the right edge to the left edge of the mobile terminal and completing the switching to the one-hand mode, the mobile terminal scales the display area down proportionally, wherein the scaled-down display area is located at the lower right corner of the screen of the mobile terminal. In some embodiments, when the current display mode is the one-hand mode, the mobile terminal may switch the current display mode to a mode other than the one-hand mode according to a click operation detected at the blank of the terminal screen.

When the mode switching instruction is a split mode switching instruction, the mobile terminal switches the current display mode according to the split mode switching instruction. When the current display mode is not a split screen mode, the mobile terminal switches the current display mode to the split screen mode according to the split mode switching instruction.

Figure 6:
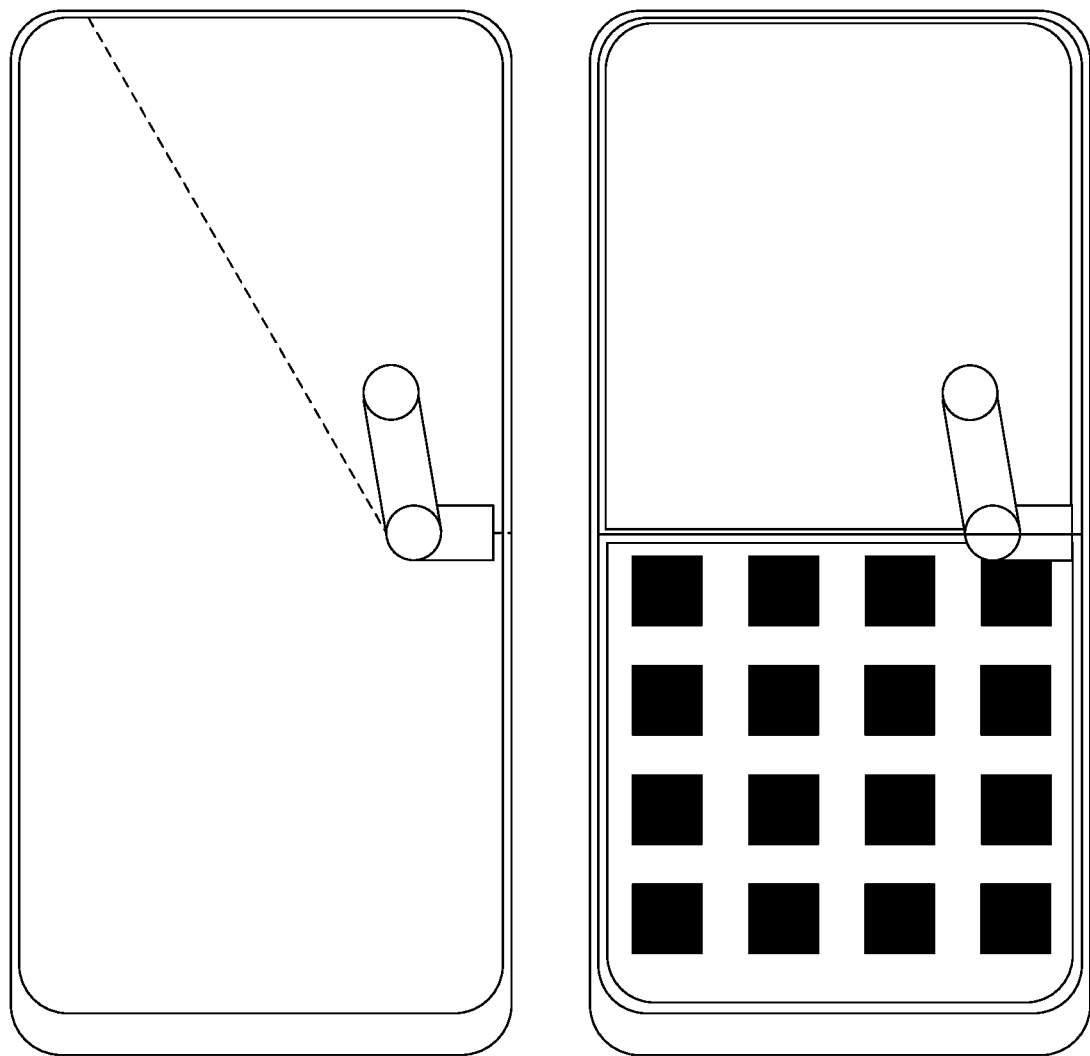
FIG. 6 is a schematic diagram illustrating yet another gesture operation according to some embodiments.

For example, referring to FIG. 6, the left-side panel is a gesture operation for switching the split screen mode, and the right-side panel is a schematic diagram of the completion of the switch. When the current display mode is switched to the split screen mode, the mobile terminal divides the display area into two parts, one part displaying an interface prior to switching, and the other part displaying an application selection interface. When the current display mode is the split screen mode, the mobile terminal switches the current display mode to a mode other than the split-screen mode according to the split screen mode switching instruction.

It should be noted that, when the mobile terminal switches the current display mode to the split screen mode, the mobile terminal divides the terminal screen into two display areas, one display area displaying a main interface, and the other area displaying an application interface that is being running. The main interface includes a plurality of application icons. When detecting that an application icon is triggered, the mobile terminal launches the application and displays an application interface of this application in the other display area.

It should be further noted that the mobile terminal may divide the terminal screen into two display areas from top to bottom, or divide the terminal screen into two display areas from left to right. In some embodiments of the present disclosure, the division of the display areas is not specifically limited. In addition, the sizes of the two display areas may be the same or different. In some embodiments of the present disclosure, the sizes of the two display areas are also not specifically limited.

In addition, in the split screen mode, the user may also adjust the sizes of the two display areas by dragging a dividing line between the two display areas. Correspondingly, when the mobile terminal detects that the dividing line is dragged, the sizes of the two display areas are adjusted according to the dragging direction and the dragging distance of the dragged dividing line.

In step S204, when detecting a ninth sliding operation from the left edge to the right edge or a tenth sliding operation from the right edge to the left edge, the mobile terminal triggers a return instruction and executes a return operation that corresponds to the return instruction, and then ends the step.

The return instruction is triggered by releasing the hand after sliding from the left edge to the right edge, or releasing the hand after sliding from the right edge to the left edge. It should be noted that the return instruction is triggered by the ninth sliding operation or the tenth sliding operation, after detecting the releasing of the hand.

Figure 7:
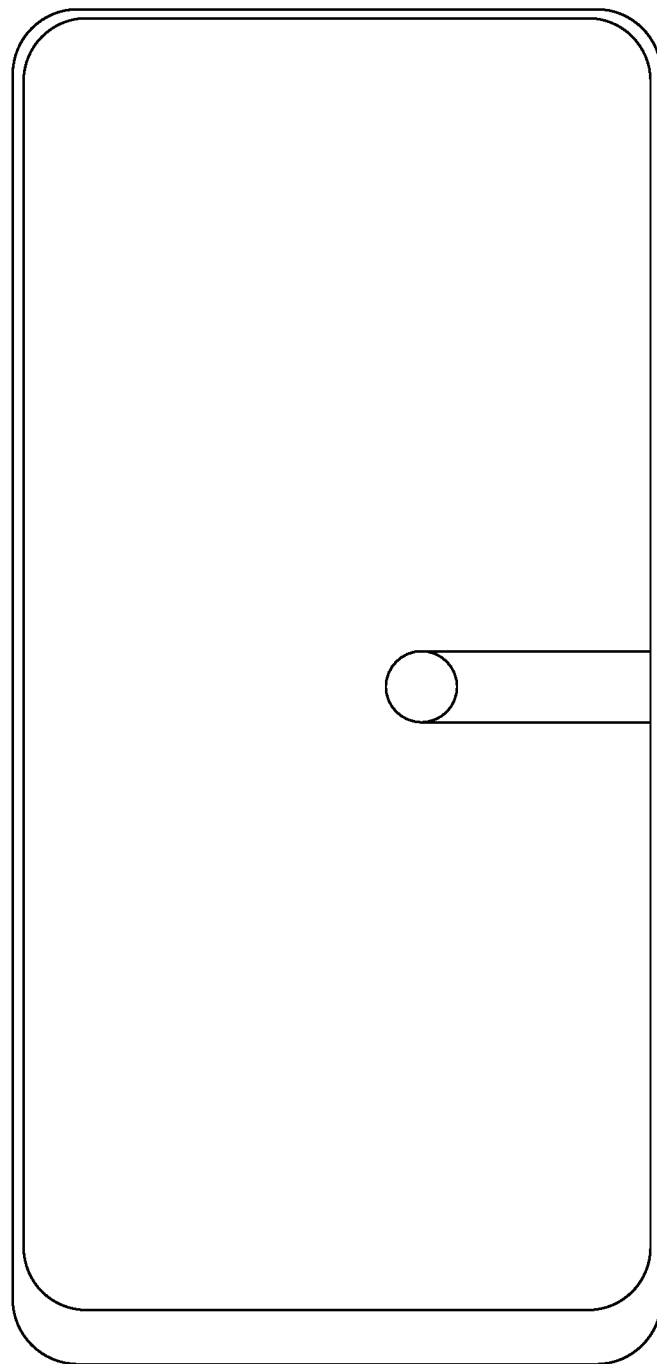
FIG. 7 is a schematic diagram illustrating yet another gesture operation according to some embodiments.

For example, the return instruction is triggered when the operation of releasing the hand after sliding from the left edge to the right edge is detected. The return instruction is not triggered when the operation of sliding from the left edge to the right edge is detected and the operation of releasing the hand is not detected. Referring to FIG. 7, the gesture operation of releasing the hand after sliding from the right edge to the left edge is illustrated to trigger the return instruction.

In step S205, the mobile terminal triggers an application switching instruction when an eleventh sliding operation from the left edge to the right edge is detected and a pause duration of the eleventh sliding operation reaches a first preset duration, or when a twelfth sliding operation from the right edge to the left edge is detected and a pause duration of the twelfth sliding operation reaches a second preset duration, and then switches an application displayed in the current interface to the previous application according to the application switching instruction.

The first preset duration and the second preset duration may be the same or different. Moreover, the first preset duration and the second preset duration may be set and changed as needed.

In some embodiments of the present disclosure, the first preset duration and the second preset duration are not specifically limited. For example, the first preset duration and the second preset duration are the same and are 1 second, 2 seconds or the like, respectively.

Figure 8:
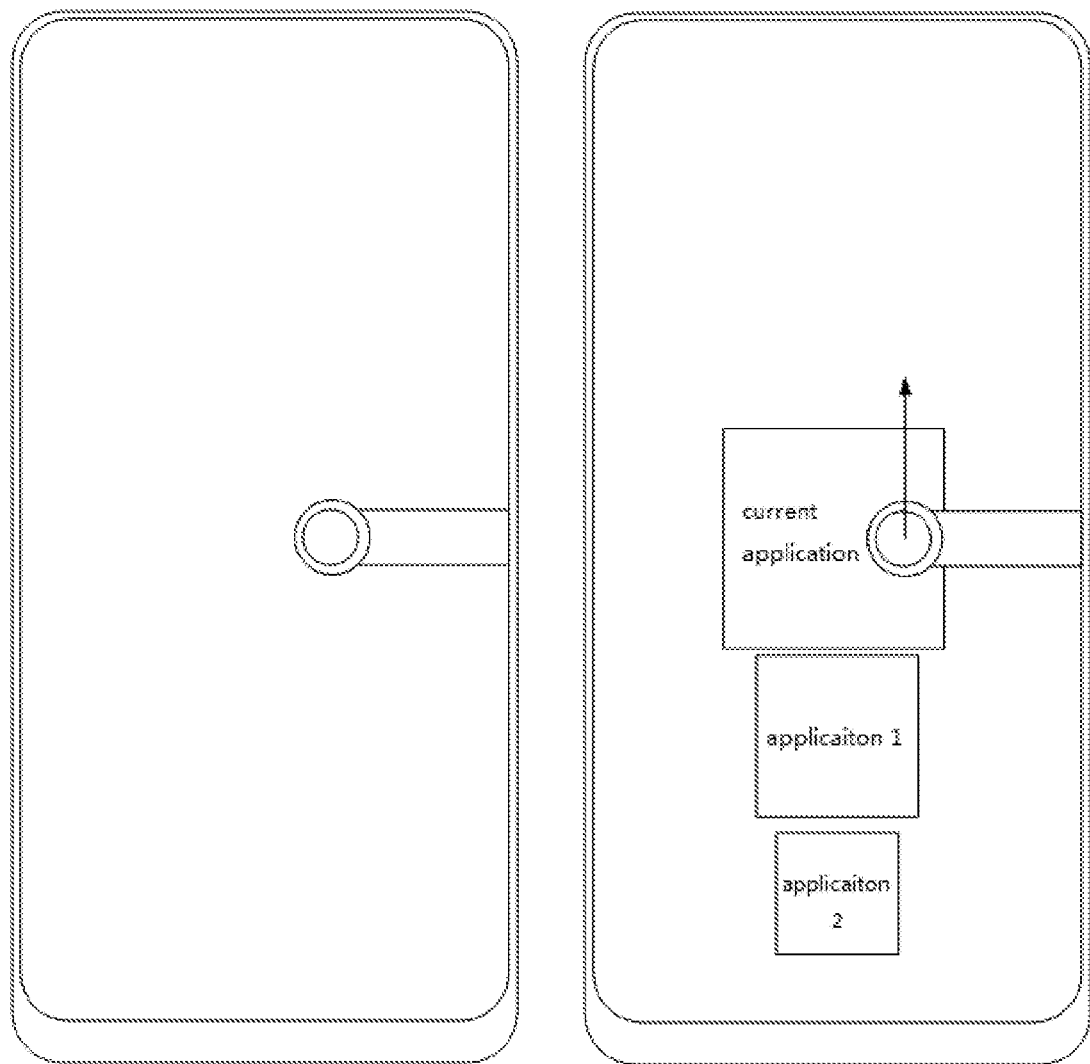
FIG. 8 is a schematic diagram illustrating yet another gesture operation according to some embodiments.

In an example, referring to the left-side panel of FIG. 8, a gesture operation of sliding from the right edge to the left edge and pausing is illustrated to trigger an instruction of switching to the previous application. In a further possible example, the mobile terminal triggers an application switching instruction when the eleventh sliding operation from the left edge to the right edge is detected and the pause duration of the eleventh sliding operation reaches the first preset duration, or when the twelfth sliding operation from the right edge to the left edge is detected and the pause duration of the twelfth sliding operation reaches the second preset duration.

The mobile terminal displays a multitask list, detects a gesture of sliding vertically, and switches applications in the multitasking list. Referring to the right-side panel of FIG. 8, a gesture operation of sliding from the right edge to the left edge and pausing is illustrated to trigger an instruction of switching to the previous application.

Since a user directly performs a specified gesture operation on the left edge or the right edge of the terminal screen, the mobile terminal can be triggered to switch the display mode, such that the operation process is simple, thereby improving the switching efficiency.

Figure 9:
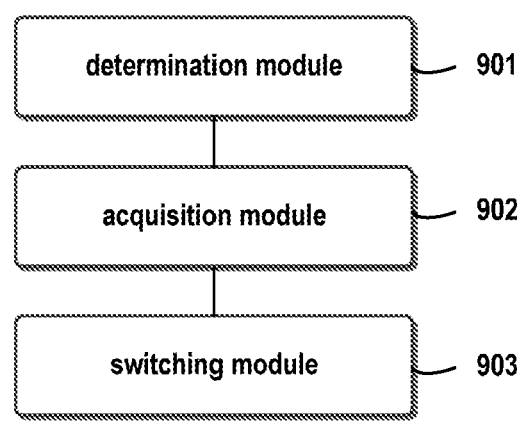
FIG. 9 is a block diagram illustrating an apparatus according to examples.

FIG. 9 is a block diagram illustrating an apparatus for switching display modes according to some embodiments of the present disclosure. Referring to FIG. 9, the apparatus can include a detection module 901, an acquisition module 902, and a switching module 903.

The various device components, units, blocks, or portions may have modular configurations, or are composed of discrete components, but nonetheless may be referred to as "modules" in general. In other words, the "components," "modules" or "units" referred to herein may or may not be in modular forms.

The detection module 901 is configured to detect a left edge and/or a right edge of a terminal screen of the mobile terminal.

The acquisition module 902 is configured to, when a specified gesture operation for switching the display mode is detected, acquire, according to the specified gesture operation, a mode switching instruction that corresponds to the specified gesture operation.

The switching module 903 is configured to switch the current display mode according to the mode switching instruction.

In some embodiments, the detection module 901 is further configured to:

detect the left edge and/or the right edge of the terminal screen of the mobile terminal;

determine that the specified gesture operation for switching the display mode is detected when a first sliding operation of sliding from the left edge to the right edge by more than a first preset distance and a second sliding operation of sliding downwards from an end position of the first sliding operation by more than a second preset distance are detected; and determine that the specified gesture operation for switching the display mode is detected when a third sliding operation of sliding from the right edge to the left edge by more than a third preset distance and a fourth sliding operation of sliding downwards from an end position of the third sliding operation by more than a fourth preset distance are detected.

In some embodiments, the apparatus further includes:

a first determination module configured to determine a first pause interval between the first sliding operation and the second sliding operation, and determine that the specified gesture operation for switching the display mode is detected when the first pause interval is less than a first preset time interval; and/or a second determination module configured to determine a second pause interval between the third sliding operation and the fourth sliding operation, and determine that the specified gesture operation for switching the display mode is detected when the second pause interval is less than a second preset time interval.

In some embodiments, the apparatus further includes:

a third determination module configured to determine a first included angle between a sliding trajectory and a vertical surface in the process of sliding downwards from the end position of the first sliding operation, and determine that the second sliding operation of sliding downwards is detected when the first included angle is within a first preset included angle range; and/or a fourth determination module configured to determine a second included angle between the sliding trajectory and the vertical surface in the process of sliding downwards from the end position of the third sliding operation, and determine that the fourth sliding operation of sliding downwards is detected when the second included angle is within a second preset included angle range.

In some embodiments, the mode switching instruction is a one-hand mode switching instruction.

In some embodiments, the detection module 901 is further configured to:

detect the left edge and/or the right edge of the terminal screen of the mobile terminal;

determine that the specified gesture operation for switching the display mode is detected when a fifth sliding operation of sliding from the left edge to the right edge by more than a fifth preset distance and a sixth sliding operation of sliding upwards from an end position of the fifth sliding operation by more than a sixth preset distance are detected; and determine that the specified gesture operation for switching the display mode is detected when a seventh sliding operation of sliding from the right edge to the left edge by more than a seventh preset distance and an eighth sliding operation of sliding upwards from an end position of the seventh sliding operation by more than an eighth preset distance are detected.

In some embodiments, the apparatus further includes:

a fifth determination module configured to determine a third pause interval between the fifth sliding operation and the sixth sliding operation, and determine that the specified gesture operation for switching the display mode is detected when the third pause interval is less than a third preset time interval; or a sixth determination module configured to determine a fourth pause interval between the seventh sliding operation and the eighth sliding operation, and determine that the specified gesture operation for switching the display mode is detected when the fourth pause interval is less than a fourth preset time interval.

In some embodiments, the apparatus further includes:

a seventh determination module configured to determine a third included angle between the sliding trajectory and the vertical surface in the process of sliding upwards from the end position of the fifth sliding operation, and determine that the sixth sliding operation of sliding upwards is detected when the third included angle is within a third preset included angle range; and an eighth determination module configured to determine a fourth included angle between the sliding trajectory and the vertical surface in the process of sliding upwards from the end position of the sixth sliding operation, and determine that the eighth sliding operation of sliding upwards is detected when the fourth included angle is within a fourth preset included angle range.

In some embodiments, the mode switching instruction is a split screen mode switching instruction.

In some embodiments, the apparatus further includes:

a first triggering module configured to trigger a return instruction when a ninth sliding operation from the left edge to the right edge or a tenth sliding operation from the right edge to the left edge is detected; and a first execution module configured to execute a return operation that corresponds to the return instruction.

In some embodiments, the apparatus further includes:

a second triggering module configured to trigger an application switching instruction when an eleventh sliding operation from the left edge to the right edge is detected and a pause duration of the eleventh sliding operation reaches a first preset duration, or when a twelfth sliding operation from the right edge to the left edge is detected and a pause duration of the twelfth sliding operation reaches a second preset duration; and a second execution module configured to switch an application displayed in the current interface to the previous application according to the application switching instruction.

Because a user directly performs a specified gesture operation on the left edge or the right edge of the terminal screen, the mobile terminal can be triggered to switch the display mode, such that the operation process is simple, thereby improving the switching efficiency. With regard to the apparatus in the above examples, the specific manners in which the respective modules execute the operations have been described in detail in examples relating to the method, and will not be explained in detail herein.

Various embodiments of the present disclosure may have one or more of the following advantages: when the user switches the display mode, the user may perform a specified gesture operation on the left edge or the right edge of the terminal screen of the mobile terminal. The mobile terminal detects the left edge and/or the right edge of the terminal screen, and when a specified gesture operation is detected, queries a mode switching instruction corresponding to the specified gesture operation, and switches the display mode according to the mode switching instruction.

Because the user directly performs a specified gesture operation on the left or right edge of the terminal screen, the mobile terminal can be triggered to switch the display mode, and the operation process is simple, thereby improving the switching efficiency.

Figure 10:
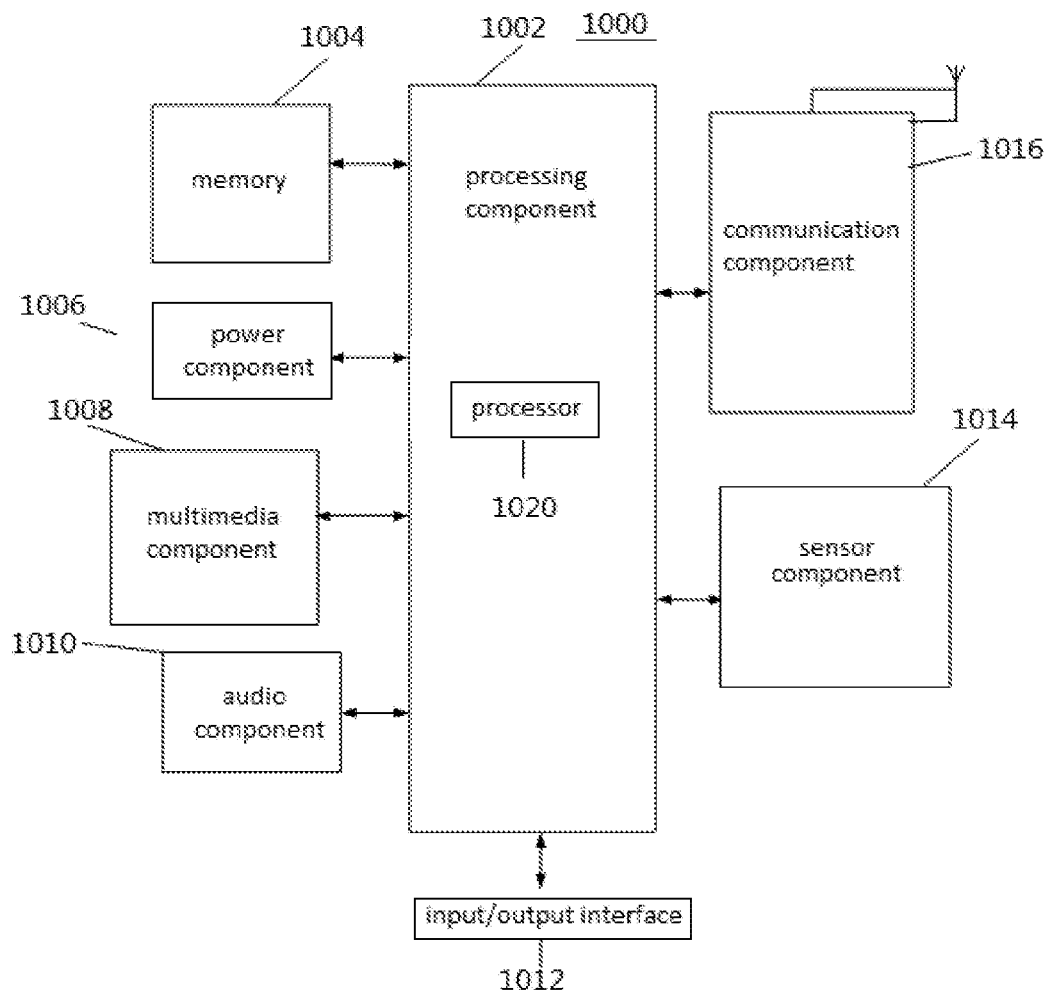
FIG. 10 is a block diagram illustrating a mobile terminal according to some embodiments.

FIG. 10 is a structural diagram of an apparatus 1000 for switching display mode according to some embodiments.

For example, the apparatus 1000 may be a mobile phone, a computer, a digital broadcast terminal, a messaging device, a gaming console, a tablet device, a medical device, a fitness equipment, a personal digital assistant, and the like.

Referring to FIG. 10, apparatus 1000 for switching display mode may include one or more of the following components: a processing circuit or component 1002, a memory device 1004, a power component 1006, a multimedia component 1008, an audio component 1010, an input/output (I/O) interface 1012, a sensor component 1014, and a communication component 1016.

The processing component 1002 typically controls the overall operations of the apparatus 1000, such as the operations associated with display, telephone calls, data communications, camera operations, and recording operations. The processing component 1002 may include one or more processors 1020 to execute instructions to perform all or part of the steps in the above described methods.

Moreover, the processing component 1002 may include one or more modules which facilitate the interaction between the processing component 1002 and other components. For instance, the processing component 1002 may include a multimedia module to facilitate the interaction between the multimedia component 1008 and the processing component 1002.

The memory 1004 is configured to store various types of data to support the operation of the apparatus 1000. Examples of such data include instructions for any applications or methods operated on the apparatus 1000, contact data, phonebook data, messages, pictures, videos, etc. The memory 1004 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the apparatus 1000. The power component 1006 may include a power management system, one or more power sources, and any other components associated with the generation, management, and distribution of power in the apparatus 1000.

The multimedia component 1008 includes a screen providing an output interface between the apparatus 1000 and the user. In some embodiments, the screen may include a liquid crystal display (LCD) and a touch panel (TP).

If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 1008 includes a front camera and/or a rear camera. The front camera and the rear camera may receive external multimedia data while the apparatus 1000 is in an operation mode, such as a photographing mode or a video mode. Each of the front camera and the rear camera may be a fixed optical lens system or have focus and optical zoom capability.

The audio component 1010 is configured to output and/or input audio signals. For example, the audio component 1010 includes a microphone (MIC) configured to receive external audio signals when the apparatus 1000 is in an operation mode, such as a call mode, a recording mode, and a voice recognition mode. The received audio signal may be further stored in the memory 1004 or transmitted via the communication component 1016. In some embodiments, the audio component 1010 further includes a speaker for outputting audio signals.

The I/O interface 1012 provides an interface between the processing component 1002 and peripheral interface modules, such as a keyboard, a click wheel, buttons, and the like. The buttons may include, but are not limited to, a home button, a volume button, a start button, and a lock button.

The sensor component 1014 includes one or more sensors to provide status assessments of various aspects of the apparatus 1000. For instance, the sensor component 1014 may detect an on/off status of the apparatus 1000, relative positioning of components, e.g., the display device and the mini keyboard of the apparatus 1000, and the sensor component 1014 may also detect a position change of the apparatus 1000 or a component of the apparatus 1000, presence or absence of user contact with the apparatus 1000, orientation or acceleration/deceleration of the apparatus 1000, and temperature change of the apparatus 1000. The sensor component 1014 may include a proximity sensor configured to detect the presence of nearby objects without any physical contact. The sensor component 1014 may also include a light sensor, such as a CMOS or CCD image sensor, used for imaging applications. In some embodiments, the sensor component 1014 may also include an accelerometer sensor, a gyroscope sensor, a magnetic sensor, a pressure sensor, or a temperature sensor.

The communication component 1016 is configured to facilitate communication, wired or wirelessly, between the apparatus 1000 and other devices. The apparatus 1000 can access a wireless network based on a communication standard, such as Wi-Fi, 2G, or 3G, or a combination thereof. In some embodiments, the communication component 1016 receives broadcast signals or broadcast associated information from an external broadcast management system via a broadcast channel. In some embodiments, the communication component 1016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the apparatus 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, a non-transitory computer-readable storage medium including instructions is also provided, such as the memory 1004 including instructions, executable by the processor 1020 in the apparatus 1000, for performing the above-described methods. For example, the non-transitory computer-readable storage medium may be a ROM, a RAM, a CD-ROM, a magnetic tape, a floppy disc, an optical data storage device, and the like.

Some embodiments of the present disclosure further provides a storage medium, including at least one instruction, at least one program, code set or instruction set therein. The instruction, program and code set or instruction set are loaded and executed by a processor to implement the operations performed by the mobile terminal in the method for switching display mode.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counterclockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

The invention claimed is:

1. A method for switching display mode of a mobile terminal, comprising:
    detecting a gesture operation at a left edge or a right edge of a screen of the mobile terminal;
    upon detection of a specified gesture operation for switching display mode, acquiring, according to the specified gesture operation, a mode switching instruction that corresponds to the specified gesture operation; and
    switching a display mode of the mobile terminal according to the mode switching instruction,
    wherein the switching the display mode of the mobile terminal according to the mode switching instruction comprises:
    switching current display mode to a one-hand mode when the mode switching instruction is a one-hand mode switching instruction and the current display mode is not the one-hand mode, wherein the one-hand mode refers to a mode in which current display interface is scaled down, and the scaled-down display interface is displayed on lower left side or lower right side of the screen of the mobile terminal;
    wherein
    the left edge is a first designated area having a width of less than half of a width of the screen, and a height not greater than a height of the screen, and is in a middle, an upper end, or a lower end of left side of the screen including a left boundary of the screen;
    the right edge is a second designated area having a width of less than half of the width of the screen, and a height not neater than the height of the screen, and is in a middle, an upper end, or a lower end of right side of the screen including a right boundary of the screen;
    during a gesture operation of sliding from the first designated area to the second designated area of the mobile terminal and completing the switching to the one-hand mode, a display area of the display interface is scaled down proportionally, and the scaled-down display area is located at the lower left corner of the screen; and
    during a gesture operation of sliding from the second designated area to the first designated area of the mobile terminal and completing the switching to the one-hand mode, the display area of the display interface is scaled down proportionally, and the scaled-down display area is located at the lower right corner of the screen of the mobile terminal.

2. The method according to claim 1, wherein said detecting a gesture operation at the left edge or the right edge of the screen of the mobile terminal comprises:
    determining that the specified gesture operation for switching the display mode is detected when a first sliding operation of sliding from the left edge to the right edge by more than a first preset distance and a second siding operation of siding downwards from an end position of the first sliding operation by more than a second preset distance are detected; and
    determining that the specified gesture operation for switching the display mode is detected when a third siding operation of siding from the right edge to the left edge by more than a third preset distance and a fourth sliding operation of sliding downwards from an end position of the third sliding operation by more than a fourth preset distance are detected.

3. The method according to claim 2, wherein prior to the detection of the specified gesture operation for switching the display mode, the method further comprises:

determining a first pause interval between the first sliding operation and the second sliding operation; and executing the step of determining that the specified gesture operation for switching the display mode is detected when the first pause interval is less than a first preset time interval.

4. The method according to claim 2, wherein prior to the detection of the specified gesture operation for switching the display mode, the method further comprises:
determining a second pause interval between the third sliding operation and the fourth sliding operation; and executing the step of determining that the specified gesture operation for switching the display mode is detected when the second pause interval is less than a second preset time interval.

5. The method according to claim 2, further comprising:
determining a first included angle between a sliding trajectory and a vertical surface in the process of sliding downwards from the end position of the first sliding operation; and determining that the second sliding operation of sliding downwards is detected when the first included angle is within a first preset included angle range.

6. The method according to claim 2, further comprising:
determining a second included angle between a sliding trajectory and a vertical surface in the process of sliding downwards from the end position of the third sliding operation; and determining that the fourth sliding operation of sliding downwards is detected when the second included angle is within a second preset included angle range.

7. The method according to claim 1, wherein said detecting a gesture operation at the left edge or the right edge of the screen of the mobile terminal comprises:
determining that the specified gesture operation for switching the display mode is detected when a fifth sliding operation of sliding from the left edge to the right edge by more than a fifth preset distance and a sixth sliding operation of sliding upwards from an end position of the fifth sliding operation by more than a sixth preset distance are detected; and
determining that the specified gesture operation for switching the display mode is detected when a seventh sliding operation of sliding from the right edge to the left edge by more than a seventh preset distance and an eighth sliding operation of sliding upwards from an end position of the seventh sliding operation by more than an eighth preset distance are detected.

8. The method according to claim 7, wherein prior to the detection of the specified gesture operation for switching the display, mode, the method further comprises:
determining a third pause interval between the fifth sliding operation and the sixth sliding operation; and executing the step of determining that the specified gesture operation for switching the display mode is detected when the third pause interval is less than a third preset time interval.

9. The method according to claim 7; wherein prior to the detection of the specified gesture operation for switching the display mode, the method further comprises:
determining a fourth pause interval between the seventh sliding operation and the eighth sliding operation; and executing the step of determining that the specified gesture operation for switching the display mode is detected when the fourth pause interval is less than a fourth preset time interval.

10. The method according to claim 7, further comprising:
determining a third included angle between the sliding trajectory and the vertical surface in the process of sliding upwards from the end position of the fifth sliding operation; and determining that the sixth sliding operation of sliding upwards is detected when the third included angle is within a third preset included angle range; and
determining a fourth included angle between the sliding trajectory and the vertical surface in the process of sliding upwards from the end position of the sixth sliding operation; and determining that the eighth sliding operation of sliding upwards is detected when the fourth included angle is within a fourth preset included angle range.

11. The method according to claim 7, wherein the mode switching instruction is a split screen mode switching instruction; and the method further comprises:
switching the current display mode to a split screen mode by dividing the screen into a first display area including a main interface, and a second display area including an application interface that is running; wherein the main interface includes a plurality of application icons; and
upon detecting that one of the plurality, of application icons is triggered, launching the application and displaying the application interface of the application in the second display area.

12. The method according to claim 1, further comprising:
triggering a return instruction when a ninth sliding operation from the left edge to the right edge or a tenth sliding operation from the right edge to the left edge are detected, and executing a return operation that corresponds to the return instruction.

13. The method according to claim 1, further comprising:
triggering an application switching instruction when an eleventh sliding operation from the left edge to the right edge is detected and a pause duration of the eleventh sliding operation reaches a first preset duration, or when a twelfth sliding operation from the right edge to the left edge is detected and a pause duration of the twelfth sliding operation reaches a second preset duration, and switching an application displayed in a current interface to a previous application according to the application switching instruction.

14. The method according to claim 1, further comprising:
determining that the specified gesture operation for switching the display mode is detected upon:
detecting a first sliding operation of sliding from the left edge to the right edge by more than a first preset distance and a second sliding operation of sliding downwards from an end position of the first sliding operation by more than a second preset distance are detected;
determining a first pause interval between the first siding operation and the second sliding operation to be less than a first preset time interval; and
determining a first included angle between a sliding trajectory and a vertical surface in the process of sliding downwards from the end position of the first sliding operation to be within a first preset included angle range; and
performing the mode switching instruction as a one-hand mode switching instruction for screen splitting.

15. A mobile terminal, comprising:
a processor; and
a memory for storing executable instructions of the processor, wherein the processor is configured to:

detect gesture operations at a left edge or a right edge of a terminal screen of the mobile terminal;

when a specified gesture operation for switching display mode is detected, acquire, according to the specified gesture operation, a mode switching instruction that corresponds to the specified gesture operation; and switch display mode according to the mode switching instruction, wherein the switching the display mode of the mobile terminal according to the mode switching instruction comprises:

switching current display mode to a one-hand mode when the mode switching instruction is a one-hand mode switching instruction and the current display mode is not the one-hand mode, wherein the one-hand mode refers to a mode in which current display interface is scaled down, and the scaled-down display interface is displayed on lower left side or lower right side of the screen of the mobile terminal;

wherein the left edge is a first designated area having a width of less than half of a width of the screen, and a height not greater than a height of the screen, and is in a middle, an upper end, or a lower end of left side of the screen including a left boundary of the screen;

the right edge is a second designated area having a width of less than half of the width of the screen, and a height not greater than the height of the screen and is in a middle, an upper end, or a lower end of right side of the screen including a right boundary of the screen;

during a gesture operation of sliding from the first designated area to the second designated area of the mobile terminal and completing the switching to the one-hand mode, a display area of the display interface is scaled down proportionally, and the scaled-down display area is located at the lower left corner of the screen; and during a gesture operation of sliding from the second designated area to the first designated area of the mobile terminal and completing the switching to the one-hand mode, the display area of the display interface is scaled down proportionally, and the scaled-down display area is located at the lower right corner of the screen of the mobile terminal.

16. The mobile terminal according to claim 15, wherein the processor is further configured to:

determine that the specified gesture operation for switching the display mode is detected when a first sliding operation of sliding from the left edge to the right edge by more than a first preset distance and a second siding operation of siding downwards from an end position of the first sliding operation by more than a second preset distance are detected; and determine that the specified gesture operation for switching the display mode is detected when a third siding operation of siding from the right edge to the left edge by more than a third preset distance and a fourth sliding operation of sliding downwards from an end position of the third sliding operation by more than a fourth preset distance are detected.

17. The mobile terminal according to claim 16, wherein the processor is further configured to:

determine a second pause interval between the third sliding operation and the fourth sliding operation; and determine that the specified gesture operation for switching the display mode is detected when the second pause interval is less than a second preset time interval.

18. The mobile terminal according to claim 16, wherein the processor is further configured to:

determine a first included angle between a sliding trajectory and a vertical surface in the process of sliding downwards from the end position of the first sliding operation; and determine that the second sliding operation of sliding downwards is detected when the first included angle is within a first preset included angle range;

wherein the switching the display mode of the mobile terminal according to the mode switching instruction is realized without user touching a switch button in the current display interface, or a physical or virtual button on the terminal screen.

19. The mobile terminal according to claim 15, wherein the processor is further configured to:

determine a first pause interval between the first sliding operation and the second siding operation; and determine that the specified gesture operation for switching the display mode is detected when the first pause interval is less than a first preset time interval.

20. A non-transitory computer-readable storage medium having stored thereon instructions that, when being executed by a processor, cause the processor to:

detect gesture operations at a left edge or a right edge of a terminal screen of a mobile terminal;

when a specified gesture operation for switching display mode is detected, acquire, according to the specified gesture operation, a mode switching instruction that corresponds to the specified gesture operation;

determine that the specified gesture operation for switching the display mode is detected when a first sliding operation of sliding from the left edge to the right edge by more than a first preset distance and a second sliding operation of sliding downwards from an end position of the first sliding operation by more than a second preset distance are detected;

determine that the specified gesture operation for switching the display mode is detected when a third sliding operation of sliding from the right edge to the left edge by more than a third preset distance and a fourth sliding operation of sliding downwards from an end position of the third sliding operation by more than a fourth preset distance are detected; and switch display mode according to the mode switching instruction, wherein the switching the display mode of the mobile terminal according to the mode switching instruction comprises:

switching current display mode to a one-hand mode when the mode switching instruction is a one-hand mode switching instruction and the current display mode is not the one-hand mode, wherein the one-hand mode refers to a mode in which current display interface is scaled down, and the scaled-down display interface is displayed on lower left side or lower right side of the screen of the mobile terminal;

wherein the left edge is a first designated area having a width of less than half of a width of the screen, and a height not greater than a height of the screen, and is in a middle, an upper end, or a lower end of left side of the screen including a left boundary of the screen;

the right edge is a second designated area having a width of less than half of the width of the screen, and a height not greater than the height of the screen, and is in a middle, an upper end, or a lower end of right side of the screen including a right boundary of the screen;

during a gesture operation of sliding from the first designated area to the second designated area of the mobile terminal and completing the switching to the one-hand mode, a display area of the display interface is scaled down proportionally, and the scaled-down display area is located at the lower left corner of the screen; and during a gesture operation of sliding from the second designated area to the first designated area of the mobile terminal and completing the switching to the one-hand mode, the display area of the display interface is scaled down proportionally, and the scaled-down display area is located at the lower right corner of the screen of the mobile terminal.

* * * * *